(12) United States Patent
Kido et al.

(10) Patent No.: US 7,972,490 B2
(45) Date of Patent: Jul. 5, 2011

(54) MAGNETIC TRANSFER MASTER DISK AND METHOD FOR MANUFACTURING THE SAME

(75) Inventors: Takeo Kido, Odawara (JP); Katsuhiro Nishimaki, Odawara (JP)

(73) Assignee: Fujifilm Corporation, Tokyo (JP)

( * ) Notice: Subject to any disclaimer, the term of this patent is extended or adjusted under 35 U.S.C. 154(b) by 259 days.

(21) Appl. No.: 12/274,444

(22) Filed: Nov. 20, 2008

(65) Prior Publication Data

US 2009/0141382 A1 Jun. 4, 2009

(30) Foreign Application Priority Data

Nov. 29, 2007 (JP) .................. 2007-308793

(51) Int. Cl.
*C25D 1/10* (2006.01)
(52) U.S. Cl. ........................................ 205/68
(58) Field of Classification Search .......... 205/67, 205/68, 183
See application file for complete search history.

(56) References Cited

U.S. PATENT DOCUMENTS

| | | | |
|---|---|---|---|
| 3,904,488 A | 9/1975 | Nosker et al. | |
| 4,341,613 A | 7/1982 | Prusak et al. | |
| 4,401,521 A | 8/1983 | Ohmura et al. | |
| 5,015,338 A * | 5/1991 | Tabuchi et al. | 205/70 |
| 6,759,183 B2 | 7/2004 | Nagao et al. | |
| 7,294,251 B2 * | 11/2007 | Nishikawa et al. | 205/68 |
| 7,648,620 B2 * | 1/2010 | Che | 205/68 |
| 2001/0028964 A1 | 10/2001 | Nagao et al. | |
| 2003/0198833 A1 | 10/2003 | Nagao et al. | |
| 2005/0045481 A1 | 3/2005 | Kawaguchi et al. | |
| 2006/0177569 A1 | 8/2006 | Fujiwara et al. | |
| 2010/0075179 A1 * | 3/2010 | Kido | 428/826 |
| 2010/0215788 A1 * | 8/2010 | Kido | 425/3 |

FOREIGN PATENT DOCUMENTS

| | | |
|---|---|---|
| EP | 1 132 898 | 9/2001 |
| JP | 2001-256644 | 9/2001 |
| JP | 2005-100605 | 4/2005 |
| JP | 2006-216181 | 8/2006 |
| JP | 2007-301732 | 11/2007 |
| KR | 2001-0088331 | 9/2001 |

OTHER PUBLICATIONS

Japanese Office Action issued Nov. 18, 2010 in corresponding Japanese Application No. 2007-308793.

* cited by examiner

*Primary Examiner* — Luan V Van
(74) *Attorney, Agent, or Firm* — Young & Thompson

(57) ABSTRACT

A magnetic transfer master disk including a magnetic layer and exhibiting excellent shape stability of a protrusion/recess pattern is provided. An initial layer formed of a conductive film is formed on a surface of a master on which a pattern of minute protrusions/recesses is formed, and then a magnetic layer (principal layer) is formed on the initial layer, and then, a metal layer is formed by electroforming. A duplicate in which the initial layer, the magnetic layer and the metal layer have been integrated is peeled off from the master, thereby obtaining a magnetic transfer master disk, which is a duplicate in which the magnetic layer and the initial layer are deposited on the protruded/recessed surface of the metal layer.

8 Claims, 8 Drawing Sheets

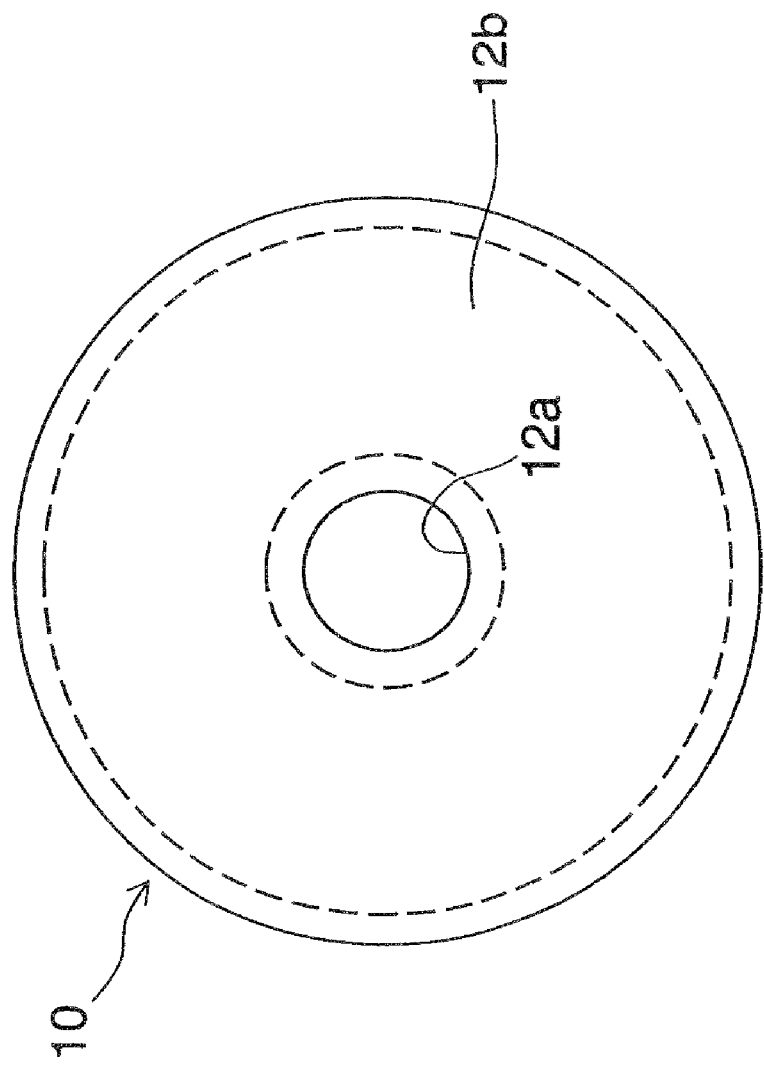

US 7,972,490 B2

MAGNETIC TRANSFER MASTER DISK AND METHOD FOR MANUFACTURING THE SAME

BACKGROUND OF THE INVENTION

1. Field of the Invention

The present invention relates to a magnetic transfer master disk used in a magnetic transfer method whereby magnetic transfer is performed from a master disk carrying transfer information to a slave medium receiving the transfer and a method for manufacturing the same, and specifically relates to a magnetic transfer master disk that is favorable for magnetically transferring magnetic information pattern such as format information to a magnetic disk used in such as a hard disk device, and a method for manufacturing the same.

2. Description of the Related Art

Magnetic disks (hard disks) are used in hard disk drives that have been rapidly prevailing in recent years. Ordinarily, after delivering a magnetic disk from a magnetic disk manufacturer to a drive manufacturer, format information and address information are written in the magnetic disk before incorporating the magnetic disk in a drive. Although this writing can be performed by means of a magnetic head, a method that performs collective transfer from a master disk with such format information and address information written therein is efficient and preferable.

In this magnetic transfer technique, a master disk and a disk on which transfer is performed (slave disk) are brought into close contact with each other, a magnetic field generation device, such as an electromagnet device, a permanent magnet device and so on, is provided to one or both sides of the disks to apply a magnetic field for transfer, thereby transferring a magnetization pattern corresponding to information the master disk has (e.g., servo signals).

As an example of a master disk used for such magnetic transfer, a master disk obtained by forming a pattern of protrusions/recesses corresponding to information signals on a surface of a substrate and coating the surface of this protrusion/recess pattern with a thin-film magnetic layer has been proposed (See, e.g., Japanese Patent Application Laid-Open Nos. 2001-256644 and 2006-216181).

This protrusion/recess pattern of the master disk is formed by duplicating protrusions/recesses on a surface of a substrate, using a metal disk as a master. The metal disk is manufactured by applying a laser or electron beam that has been modulated according to information to a silicon (Si) primitive plate coated with a photoresist while rotating the primitive plate, forming a conductive layer on the surface of the primitive plate having protrusions/recesses, obtained as a result of developing the photoresist, by means of, e.g., sputtering, and then, performing plating (electroforming) on this conductive layer to obtain a metal mold, and removing the metal mold from the plate.

A magnetic transfer master disk requires a magnetic layer formed of a material with high magnetic permeability, and in the technique disclosed in Japanese Patent Application Laid-Open No. 2006-216181, a magnetic layer doubles as a conductive layer for electroforming.

SUMMARY OF THE INVENTION

However, as protrusion/recess patterns of Si masters are becoming finer, a problem has arisen in that both the requirements for forming a film with high magnetic permeability, and the requirements for easily peeling a Ni duplicate off from a Si master cannot be met, resulting in protrusions of the Ni duplicate being often chipped off.

The present invention has been made in view of such circumstances, and an object of the present invention is to provide a magnetic transfer master disk constructed to easily peel a duplicate off from a master while maintaining the magnetic permeability of a magnetic layer and a method for manufacturing the same.

In order to achieve the above object, according to an aspect of the present invention, a method for manufacturing a magnetic transfer master disk including a protrusion/recess pattern corresponding to information to be transferred, the method includes: an initial layer forming step of forming an initial layer having conductivity, on a surface of an inverted-mold master including an inverted protrusion/recess pattern; a principal layer forming step of forming a principal layer having a magnetic property, on a surface of the initial layer of the inverted-mold master after formation of the initial layer; an electroforming step of forming a metal layer on a surface of the principal layer of the inverted-mold master via electroforming after formation of the principal layer; and a peeling step of peeling a duplicate, in which the initial layer, the principal layer and the metal layer are integrated, off from the inverted-mold master after the electroforming step, so as to obtain a magnetic transfer master disk, which is the duplicate, in which the principal layer and the initial layer are deposited on a protruded/recessed surface of the metal layer.

According to the aspect of the present invention, electroforming is performed after a conductive layer including a laminated structure of an initial layer and a magnetic layer (principal layer) is formed on a surface of an inverted-mold master, and accordingly, the peelability of a duplicate (electroformed body) is enhanced and the protrusions are prevented from chipping off, enabling provision of a magnetic transfer master disk with good shape stability.

Further, according to another aspect of the present invention, a magnetic transfer master disk including a protrusion/recess pattern corresponding to information to be transferred, comprises: a principal layer having a magnetic property, which is formed on a protrusion/recess pattern of a metal disk by electroforming; and an initial layer formed on the principal layer, which functions as a conductive layer when performing the electroforming.

The magnetic transfer master disk according to the aspect of the present invention accurately expresses the protrusions and recesses of a mother die used for electroforming, and provides stable magnetic transfer that is excellent in quality of signals after magnetic transfer.

In the magnetic transfer master disk, preferably, a film thickness of the initial layer is 1 to 100 nm, more preferably, 1 to 50 nm, further more preferably, 2 to 20 nm.

Further, according to a further another aspect of the present invention, in the magnetic transfer master disk, the metal disk is formed by Ni-electroforming and the initial layer is a Ni film. A Ni film can easily be formed and is suitable for a conductive film.

According to the aspects of the present invention, a pattern of minute protrusions/recesses can be formed with high accuracy, enabling to provide a magnetic transfer master disk with excellent transfer characteristics. Further, use of a magnetic transfer master disk according to the aspects of the present invention enables magnetic transfer with stable quality.

BRIEF DESCRIPTION OF THE DRAWINGS

FIG. 2 is a plan view of a magnetic transfer master disk;

DETAILED DESCRIPTION OF THE PREFERRED EMBODIMENTS

Hereinafter, a preferred embodiment of the present invention will be described with reference to the accompanying drawings.

[Description of a Master Disk]

Figure 1:
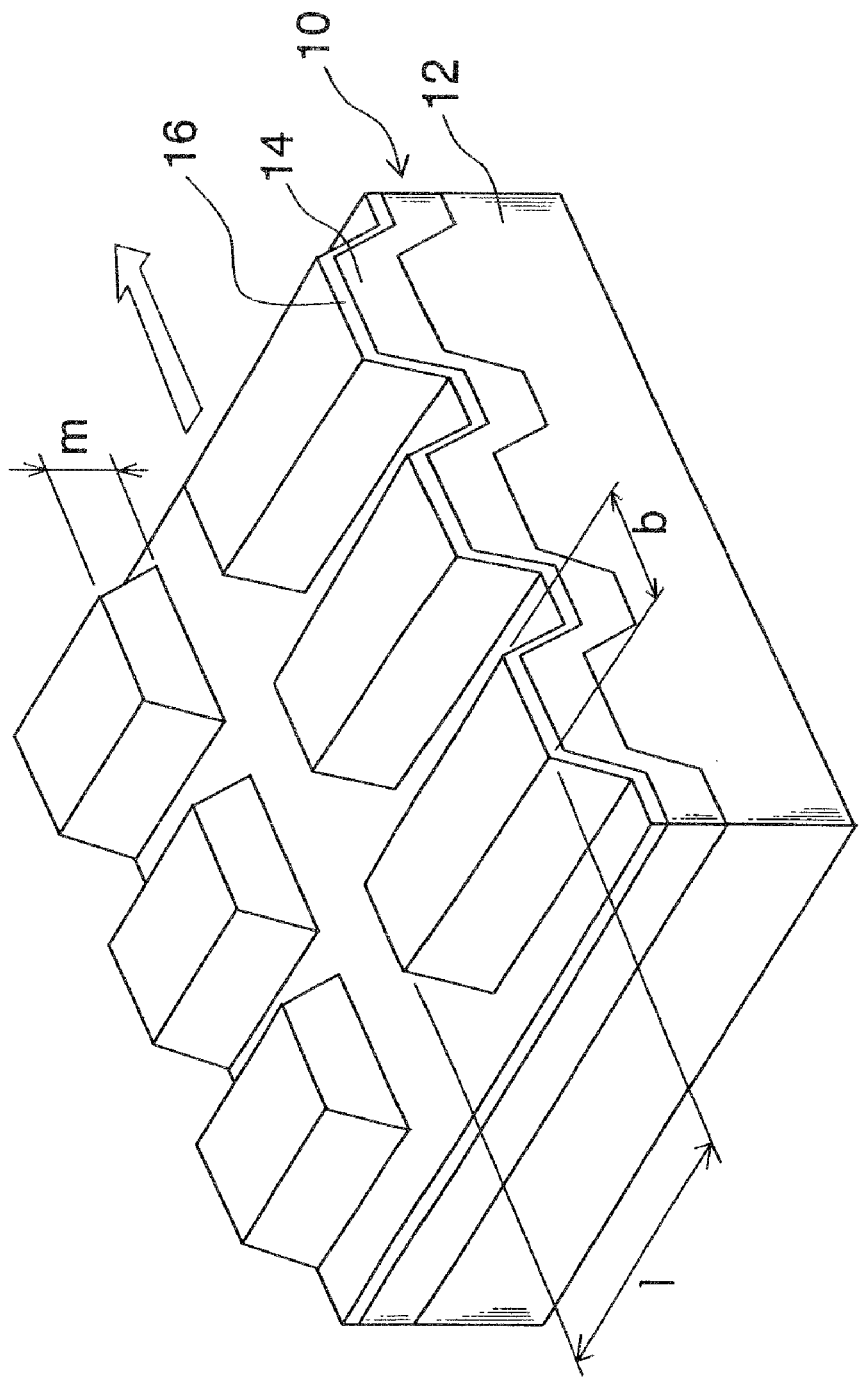
FIG. 1 is a perspective view of a partial expansion of a magnetic transfer master disk according to an embodiment of the present invention.

FIG. 1 is a perspective view of a partial expansion of a magnetic transfer master disk according to an embodiment of the present invention. FIG. 2 is a plan view of a magnetic transfer master disk. For ease of illustration, the ratios in these figures are different from those in the actual dimensions.

As shown in FIG. 1, a magnetic transfer master disk according to the present embodiment (hereinafter, referred to as "master disk") 10 includes a master substrate 12 made of a metal (corresponding to a "metal layer" or a "metal disk"), a magnetic layer 14 (corresponding to a "principal layer"), and an initial layer 16. The master substrate 12 has a pattern of minute protrusions/recesses according to transfer information on a surface thereof, and the protruded/recessed surface is coated with the magnetic layer 14, and the magnetic layer 14 is further coated with the initial layer 16. Although not shown, it is preferable to provide a protective layer and/or a lubricating layer on the initial layer 16.

A protrusion in the minute protrusion pattern is a rectangle in planar view, and the values of the length b in the track direction (the direction of the thick arrow in the figure), the length l in the radial direction, and the height (thickness) m of the protrusion are determined according to, e.g., the recording density and the recording signal wavelength. For example, the length b may be 80 nm and the length l may be 200 nm.

In the case of a servo signal for a magnetic recording medium used in a hard disk device, this minute protrusion is formed so that the length l in the radial direction is longer compared to the length b in the track direction. For example, it is preferable that: the length l in the radial direction is 0.05 to 20 μm; and the length of the track direction (circumferential direction) is 0.05 to 5 μm. For a protrusion carrying information for a servo signal, it is preferable to use a protrusion whose length in the radial direction is longer within these ranges.

Preferably, the depth (height m) of a protrusion is within the range of 20 to 800 nm, and more preferably, the range of 30 to 600 nm.

As shown in FIG. 2, the master disk 10 is formed in the shape of a disk having a central hole 12a, and a protrusion/recess pattern as shown in FIG. 1 is formed in an annular region 12b of one side of the master disk 10 excluding inner and outer circumferential portions.

In the master disk 10, where the master substrate 12 is a ferromagnetic body mainly including such as Ni, magnetic transfer can be performed by means of this master substrate 12 only and there is no need for coating with the magnetic layer 14. However, provision of the magnetic layer 14 having good transfer characteristics enables more favorable magnetic transfer.

The master disk 10 according to the present embodiment, as described layer, is manufactured by forming the initial layer 16 and the magnetic layer 14 on a master with a protrusion/recess pattern according to information to be transferred formed thereon (inverted-mold master), then depositing a metal layer having a predetermined thickness (a metal disk corresponding to the master substrate 12) by means of Ni-electroforming, peeling a duplicate, which is an electroformed body in which the initial layer 16, the magnetic layer 14 and the metal layer (the master substrate 12) are integrated, off from the master, and then cutting/punching out the outer circumferential portion and the portion of the central hole 12a in desired sizes.

[Description of a Method for Manufacturing a Master Disk]

Figure 3A:
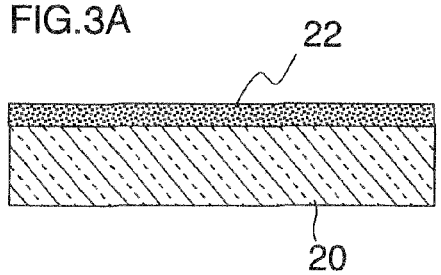
FIGS. 3A to 3I are cross-sectional diagrams illustrating the processes for manufacturing a magnetic transfer master disk in order.
Figure 3B:
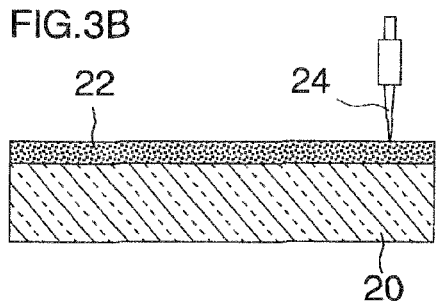

Next, a method for manufacturing the master disk 10 will be described with reference to FIGS. 3A to 3I. First, as shown in FIG. 3A, an electron beam resist liquid is applied by means of such as spin coating to a primitive plate 20, which is a silicon wafer with a flat and smooth surface (and which may also be a glass plate or a quartz glass plate) (resist application process) to form a resist layer 22, and performing baking treatment (pre-baking).

Next, the primitive plate 20 is set on a stage of an electron beam exposure apparatus (not shown) including an highly-accurate rotary stage or X-Y stage, and while rotating the primitive plate 20, an electron beam 24 modulated according to servo signals is applied to the primitive plate 20 (FIG. 3B), whereby a predetermined pattern such as a pattern corresponding to servo signals, which linearly extend in the radial direction from the center of the rotation on the respective tracks, are drawn by exposure in circumferential portions corresponding to the respective frames, on a substantially-entire surface of the resist layer 22 (electron beam drawing process).

Figure 3C:
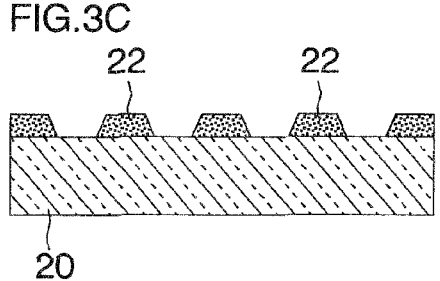

Next, as shown in FIG. 3C, the resist layer 22 is subjected to development treatment to remove the exposed portions, thereby obtaining a coating layer with a predetermined thickness, formed of the remaining resist layer 22. This coating layer is used as a mask in the next process (etching process). After the development treatment, baking treatment (post-baking) is performed to enhance the adhesion between the resist layer 22 and the primitive plate 20.

Figure 3D:
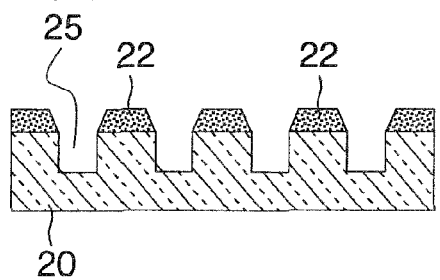

Next, as shown in FIG. 3D, a portion of the primitive plate 20 is removed by a predetermined depth from a surface of the primitive plate 20, through an opening 23 of the resist layer 22 (etched). For this etching, in order to minimize undercutting (side-etching), anisotropic etching is preferable. For such anisotropic etching, it is preferable to employ reactive ion etching (RIE). For this etching, in order to minimize undercutting (side-etching), anisotropic etching is preferable. For such anisotropic etching, it is preferable to employ reactive ion etching (RIE).

Figure 3E:
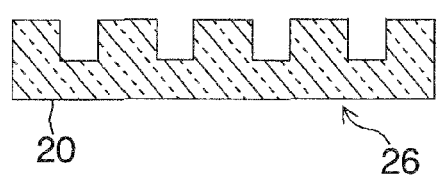

Next, as shown in FIG. 3E, the resist layer 22 is removed. For a method for removing the resist layer 22, ashing can be employed as a dry process, and a removal method using a stripper can be employed as a wet process. As a result of the above-mentioned ashing process, a master 26 with an inverted mold for a predetermined protrusion/recess pattern formed therein (Si master corresponding to an "inverted-mold master") is prepared.

Figure 3F:
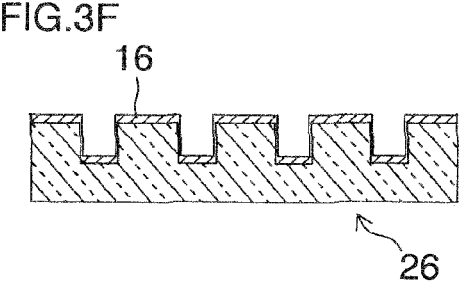

Next, as shown in FIG. 3F, an initial layer 16 with a uniform thickness, which is a conductive layer, is formed on the protruded/recessed surface of the master 26. For a method for forming the conductive film, various types of metal film formation methods including PVD (physical vapor deposition), CVD (chemical vapor deposition), sputtering and ion plating can be employed. In this embodiment, for the conductive film for the initial layer 16, a Ni film is formed by sputtering. Such a film containing Ni as its main component can easily be formed, and thus, is suitable for a conductive layer. The film thickness of the initial layer 16 is 1 to 100 nm, more preferably, 1 to 50 nm, further preferably, 2 to 20 nm. Where Ni in the initial layer 16 becomes overly thick, recessed defects tend to easily occur on the surface of a duplicate, and accordingly, it is desirable to provide a required minimum thickness.

The material of the initial layer 16 is not limited to Ni, and Ru, Pt and other metals, and alloys of them (e.g., CoPt), etc., can be used.

Figure 3G:
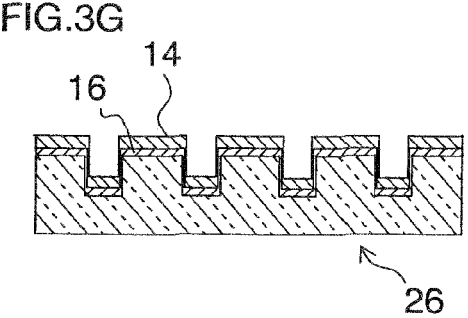

Next, as shown in FIG. 3G, a magnetic layer 14 (principal layer), which is a magnetic film, is formed on the initial layer 16. The formation of the magnetic layer 14 (magnetic film) is performed by forming a film of a magnetic material by means of, e.g., a vacuum film-forming method such as vacuum deposition, sputtering, ion plating, or plating (including nonelectrolytic plating). For the magnetic material of the magnetic layer 14, Co, a Co alloy (e.g., CoNi, CoNiZr, CoNbTaZr), Fe, a Fe alloy (FeCo, FeCoNi, FeNiMo, FeAlSi, FeAl, FeTaN), Ni, a Ni alloy (NiFe) can be used.

In particular, it is preferable to use FeCo or FeCoNi. It is preferable that the thickness of the magnetic layer 14 is within the range of 50 to 500 nm.

Figure 3H:
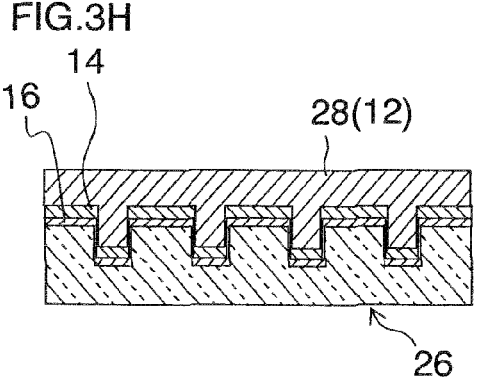

Next, as shown in FIG. 3H, electroforming (electrodeposition) is performed using the conductive layer including the initial layer 16 and the magnetic layer 14 formed on the surface of the master 26 as the cathode to form a metal layer 28 with a desired thickness (here, a Ni-electroformed film), thereby obtaining a metal plate corresponding to the master substrate 12 described with reference to FIG. 1 (electroforming process).

This electroforming process is performed by immersing the master 26 in an electrolyte in an electroforming apparatus, and making current flow between the cathode and the anode, using the conductive layer of the master 26 (the initial layer 16 and the magnetic layer 14) as the cathode. At this time, it is necessary to determine the concentration and pH of the electrolyte, and the method for applying current to the electrolyte, etc., so as to achieve the optimum conditions, which provide a metal plate (i.e., the master substrate 12) without distortion.

Then, after the end of electrodeposition as described above, the master 26 with the metal layer 28 having a predetermined thickness deposited thereon is taken out of the electrolyte in the electroforming apparatus and then is immersed in pure water in a peeling tank (not shown).

Figure 3I:
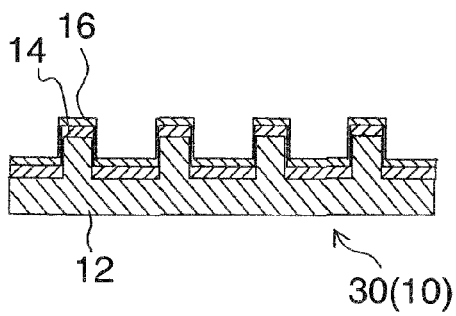

Next, in the peeling tank, the electroformed body (duplicate 30), in which the initial layer 16, the magnetic layer 14 and the metal layer 28 have been integrated, is peeled off from the master 26 (peeling process), and the duplicate 30, as shown in FIG. 3I, including a protrusion/recess pattern, which is an inversion of the protrusion/recess pattern of the master 26.

Where a protective layer is formed on the initial layer 16, a carbon film is formed on the master disk 10 by means of sputtering, the master disk 10 being obtained by punching/cutting out the inner and outer circumferential portions of this duplicate 30 in predetermined sizes after peeling the duplicate 30 off from the master 26.

The magnetic transfer master disk 10 is manufactured as described above.

Also, where a large magnetic strength is desired, a magnetic layer is formed once again (post-formation) on the master disk 10, which has been obtained by punching or cutting the inner and outer circumferential portions of this duplicate 30 in predetermined sizes after peeling the duplicate 30 off from the master 26, and then a protective layer is formed.

According to the above-described manufacturing method, the duplicate 30 can exhibit good mold releasability at the peeling process, enabling prevention of deformation of the protrusions. As a result, a magnetic transfer master disk 10 that accurately expresses the protrusions/recesses of the master 26 can be obtained, enabling magnetic transfer with good signal quality.

Also, as shown in FIG. 1, a protrusion in the protrusion pattern in the master disk 10 is a trapezoid in side view, and as the rising angle of the protrusion is closer to 90° (i.e., the shape of the protrusion in side view is closer to a rectangle), it becomes more difficult to peel the duplicate 30 off from the master 26.

According to the manufacturing method according to the present embodiment, the mold-releasability of the duplicate 30 is improved compared to conventional methods, it becomes possible to make the shapes of the protrusions be closer to rectangles, enabling enhancement of the density and accuracy of the pattern.

Also, in the manufacturing method according to the present embodiment, one master 26 can repeatedly be used, enabling manufacture of a plurality of duplicates from one master 26.

[Preferred Shape of Trapezoids of Protrusions in a Duplicate]

Figure 4:
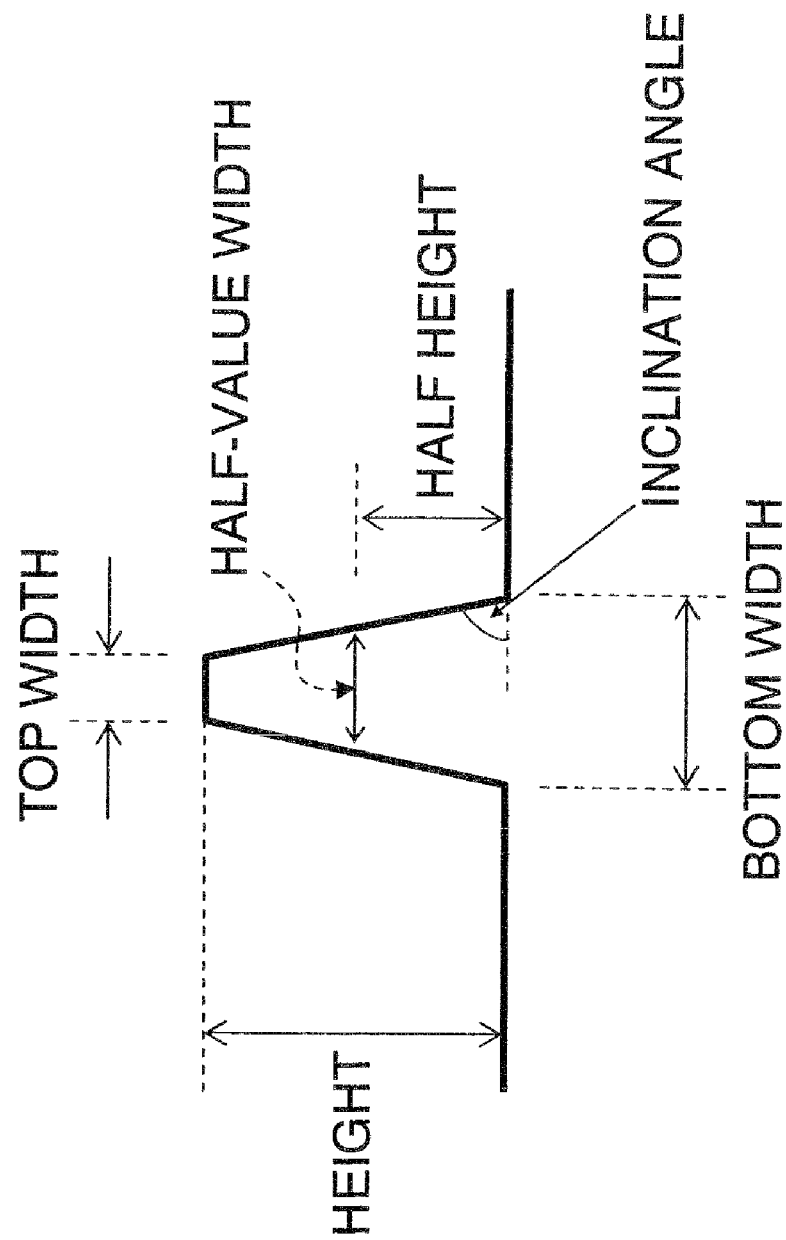
FIG. 4 is an illustrative diagram relating the definition of the shape of a trapezoid of a protrusion of a duplicate.

FIG. 4 is a schematic diagram of a trapezoid of a protrusion of a Ni duplicate. As shown in the figure, the "height" and "half-value width" of the protrusion, and the "inclination angle of an "inclined surface of the trapezoid are defined. The half-value width is the width of the protrusion at a position half the height. Also, here, the aspect ratio of the trapezoid of the protrusion is defined as the "height/half-value width".

Preferable ranges of the height and half-value width of a duplicate in the present embodiment are 5 to 800 nm for the height and 3 to 20000 nm for the half-value width. More preferable ranges are 10 to 600 nm for the height and 7 to 5000 nm for the half-value width. Further preferable ranges are 20 to 400 nm for the height and 10 to 500 nm for the half-value width. More specifically, for example, a plurality of protrusions with a height of 100 nm and a half-value width of 40 to 250 nm exist in one duplicate.

A preferable range of the aspect ratio is 0.05 to 50.0. More preferable range is 0.02 to 10.0. A further preferable range is 0.2 to 5.0. More specifically, for example, a plurality of protrusions with an aspect ratio of 0.5 (=100/250) to 2.5 (=100/40) exist in one duplicate.

A preferable range of the inclination angle of the inclined surface of the trapezoid is 20 to 90°. A more preferable range is 30 to 89°. A further preferable range is 40 to 88°. More specifically, for example, the inclination angle is designed to be approximately 82°.

The peelability of the duplicate can be further enhanced when the bottom portion of the protrusion is formed in a skirt shape (rounded), not an exact trapezoid.

The shape of trapezoids of protrusions in a duplicate can be formed by RIE (reactive ion etching). The inclination angle of the trapezoids is controlled by changing, e.g., the etching rate, the type of etching gas and the mix ratio.

Example

An initial layer having a thickness of 3 nm, which includes Ni, was formed on a surface of a Si master having multiple minute protrusions/recesses formed thereon (corresponding to an "inverted-mold master"), by means of sputtering, and then, a principal layer having a thickness of 60 nm, which has magnetic properties and includes FeCo, was formed also by means of sputtering. Ni-electroforming was performed on the surface of the Si master on which a conductive layer formed of two layers, i.e., these Ni initial layer (3 nm) and FeCo principal layer (60 nm) has been formed, thereby a Ni duplicate having a thickness of 150 μm having been formed. As a result of peeling this duplicate off from the Si master, a master disk with good shape stability (with no deformation of protrusions/recesses) was obtained.

[Description of a Magnetic Transfer Method]

Next, a magnetic transfer method using the magnetic transfer master disk 10 according to the present embodiment will be described. Here, description will be made in terms of a case where servo signals, etc., are transferred to a perpendicular magnetic recording medium, which is used in a hard disk device.

Figure 5:
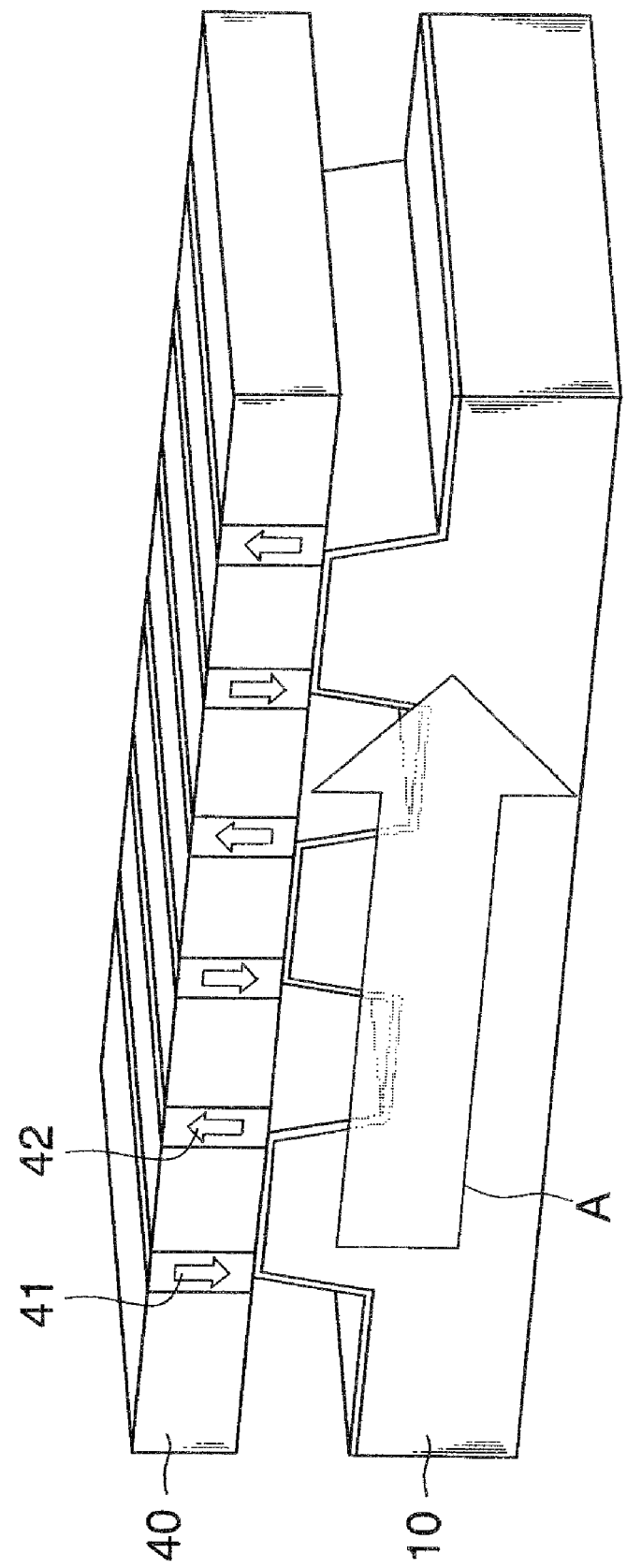
FIG. 5 is an illustrative diagram of magnetic transfer using horizontal magnetization.

FIG. 5 is a schematic diagram of a magnetic transfer method using horizontal magnetization. In this figure, a slave disk (perpendicular magnetic recording medium) 40 is a magnetic disk on which transfer is to be performed. The master disk 10 has a transfer information carrying surface where minute protrusions are formed, on one side thereof, and the surface opposite this transfer information carrying surface (rear side) is held by an attaching device (not shown).

During magnetic transfer, as shown in FIG. 5, the transfer information carrying surface of the master disk 10 is brought into close contact with the slave disk 40, and a magnetic field in the in-plane direction (the direction indicated by arrow A in FIG. 5) is applied to the master disk 10. As a result of application of this in-plane magnetic field, magnetic fields in the perpendicular direction are generated at edges of the protrusions of the master disk 10, and these magnetic fields in the perpendicular direction magnetize the positions of the magnetic layer of the slave disk 40 corresponding to the edges of the protrusions, in the perpendicular direction. Arrows 41 and 42 in FIG. 5 schematically indicate magnetization directions.

Consequently, magnetic information reflecting the protrusion/recess pattern of the master disk 10 is recorded onto the slave disk 40. Subsequently, the application of the magnetic field is discontinued and the slave disk 40 is detached from the master disk 10, thereby obtaining a perpendicular magnetic recording medium with servo signals, etc., recorded thereon.

Figure 6:
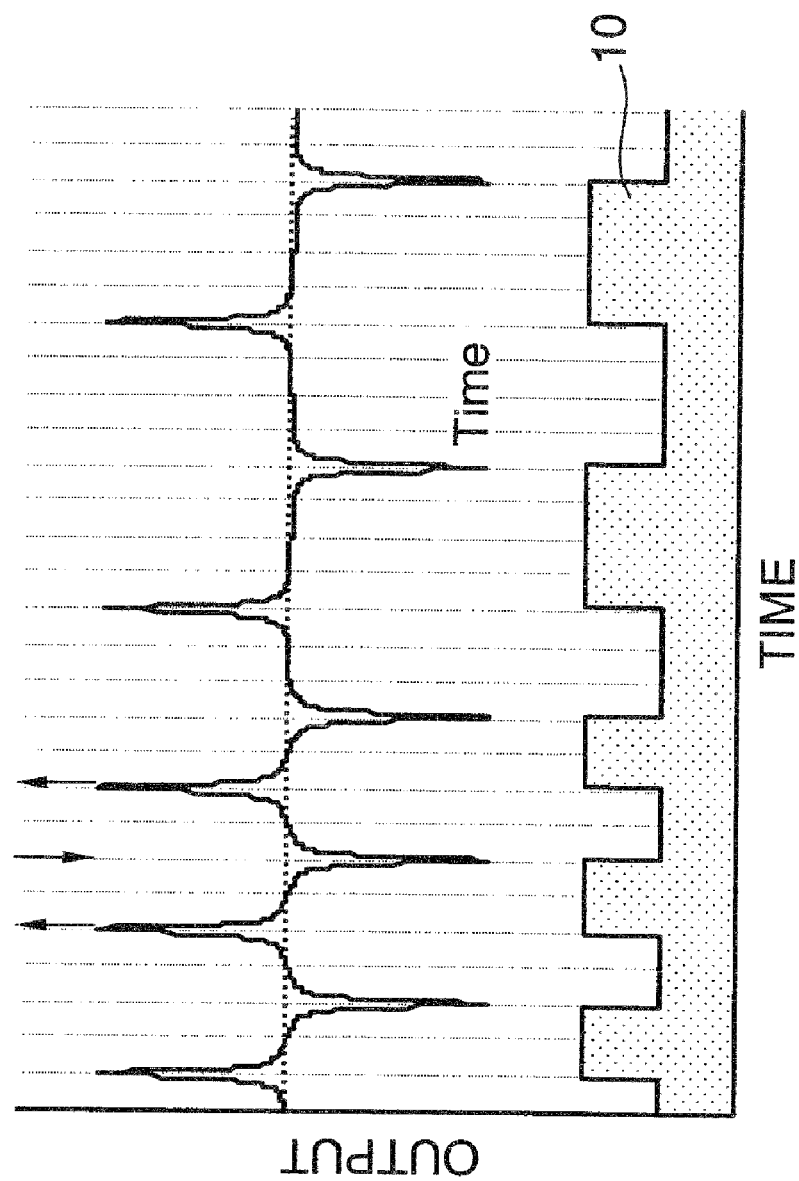
FIG. 6 is a diagram illustrating an example of the waveform of a reproduced signal from a perpendicular magnetic recording medium on which magnetic transfer has been performed using horizontal magnetization.

FIG. 6 is an example of a waveform of a reproduced (output) signal of a signal recorded on the slave disk 40 by means of magnetic transfer according to the horizontal magnetization described with reference to FIG. 5. As shown in FIG. 6, a reproduced signal exhibiting peaks at positions of the slave disk 40 corresponding to the edges of the protrusions of the master disk 10 (boundaries between the protrusions and recesses) can be obtained.

Figure 7:
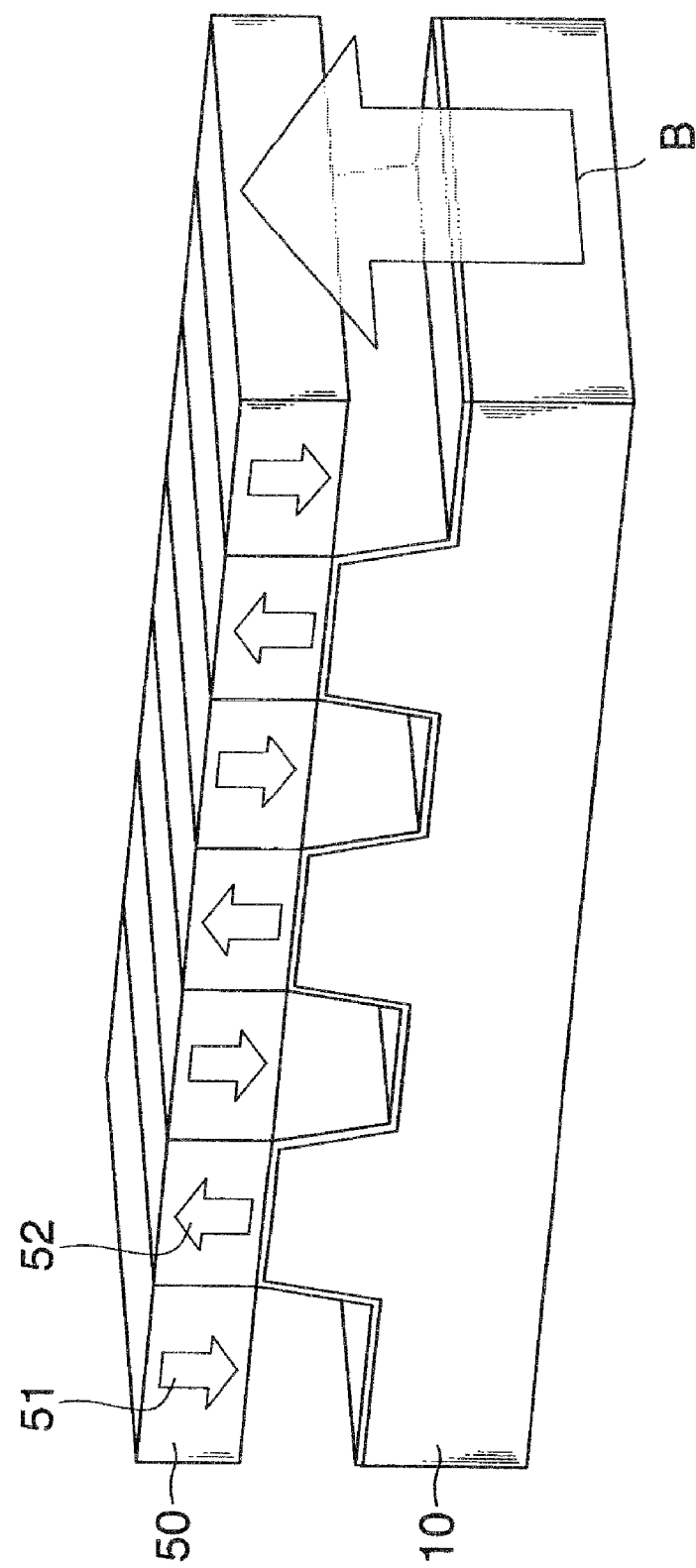
FIG. 7 is an illustrative diagram of magnetic transfer using perpendicular magnetization.

FIG. 7 is a schematic diagram of magnetic transfer according to perpendicular magnetization. In the figure, a slave disk (perpendicular magnetic recording medium) 50 is a magnetic disk on which transfer is to be performed. In the case of perpendicular magnetization, initial magnetization is performed by applying a direct current magnetic field in the perpendicular direction to the slave disk 50 in advance to transfer (initial magnetization process), and subsequently, as shown in FIG. 7, the master disk 10 and the slave disk 50 are brought into close contact with each other, and a magnetic field in the perpendicular direction (magnetic field in the direction indicated by arrow B) opposite the direction of the initial magnetization is applied. As a result of application of this magnetic field, the positions of the magnetic layer of the slave disk 50 that are in contact with the protrusions of the master disk 10 are magnetized in the direction opposite the direction of the initial magnetization. Arrows 51 and 52 in FIG. 7 schematically indicate magnetization directions.

Consequently, magnetic information reflecting the protrusion/recess pattern of the master disk 10 is recorded onto the slave disk 50. Subsequently, the application of the magnetic field is discontinued, and the slave disk 50 is detached from the master disk 10, thereby obtaining a perpendicular magnetic recording medium with servo signals, etc., recorded thereon.

Figure 8:
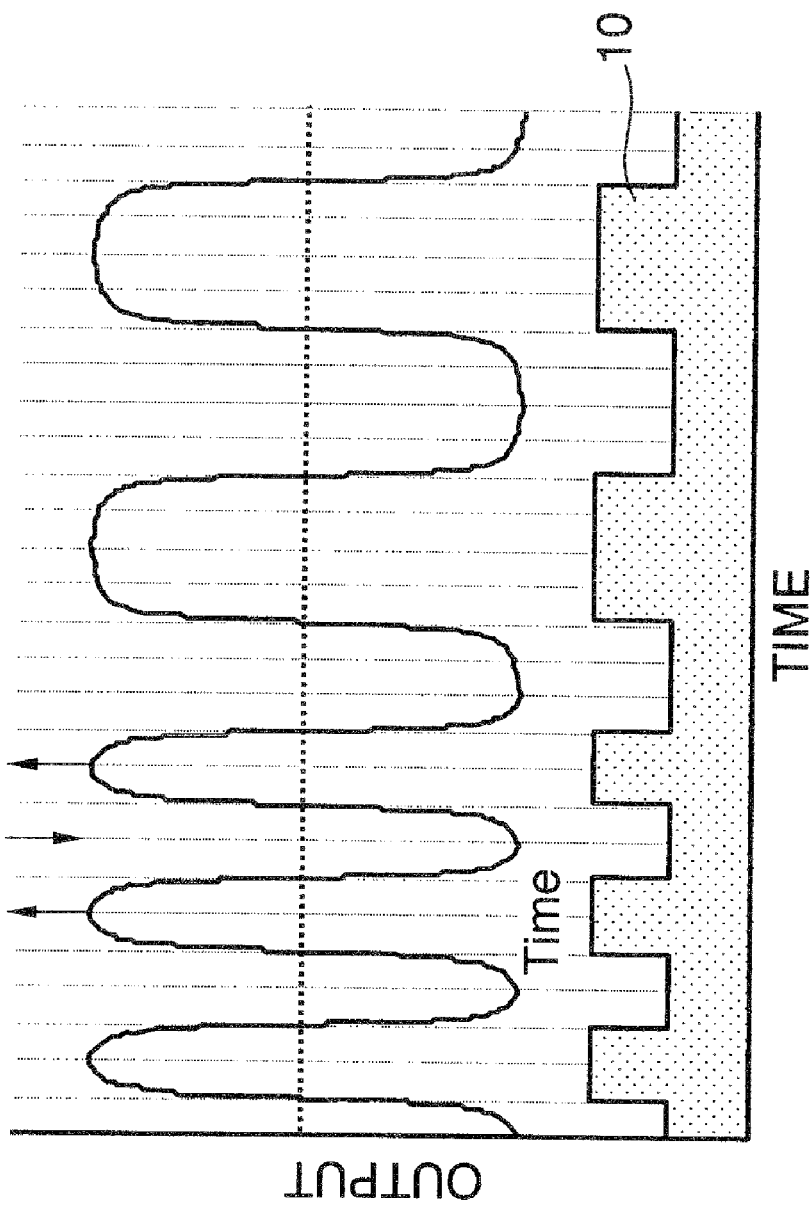
FIG. 8 is a diagram illustrating an example of the waveform of a reproduced signal from a perpendicular magnetic recording medium on which magnetic transfer has been performed using perpendicular magnetization.

FIG. 8 is an example of the waveform of a reproduced (output) signal of a signal recorded on the slave disk 50 by means of magnetic transfer according to the perpendicular magnetization described with reference to FIG. 7. As shown in FIG. 8, a reproduced signal exhibiting peaks at the positions of the slave disk 50 corresponding to the centers of the protrusions and the recesses of the master disk 10 can be obtained.

Even though the protrusion/recess pattern of the master disk 1I is a negative protrusion/recess pattern opposite to the positive pattern shown in FIG. 3I, a magnetization pattern similar to the positive pattern can be transferred and thereby recorded by reversing the directions of an initial magnetic field Hi and a magnetic field for transfer lid during magnetic transfer so as to be opposite those for the positive pattern.

As a result of performing magnetic transfer using the master disk 10 according to the present invention, a magnetic recording medium including servo signals, etc., with good signal quality recorded therein can be manufactured.

What is claimed is:

1. A method for manufacturing a magnetic transfer master disk including a protrusion/recess pattern corresponding to information to be transferred, the method comprising:

an initial layer forming step of forming an initial layer having conductivity using Ni, Ru, Pt, or alloys of them, on a surface of an inverted-mold master including an inverted protrusion/recess pattern;

a principal layer forming step of forming a principal layer having a magnetic property using Co, a Co alloy, Fe, or a Fe alloy, on a surface of the initial layer of the inverted-mold master after formation of the initial layer;

an electroforming step of forming a metal layer on a surface of the principal layer of the inverted-mold master via electroforming after formation of the principal layer with a conductive layer including the initial layer and the principal layer as a cathode; and a peeling step of peeling a duplicate, in which the initial layer, the principal layer and the metal layer are integrated, off from the inverted-mold master after the electroforming step, so as to obtain a magnetic transfer master disk, which is the duplicate, in which the principal layer and the initial layer are deposited on a protruded/recessed surface of the metal layer.

2. The method for manufacturing a magnetic transfer master disk according to claim 1, wherein a film thickness of the initial layer is 2 to 20 nm.

3. The method for manufacturing a magnetic transfer master disk according to claim 2, wherein a film thickness of the principal layer is 50 to 500 nm.

4. The method for manufacturing a magnetic transfer master disk according to claim 1, wherein the duplicate has a protrusion/recess pattern that has been inverted from the protrusion/recess pattern of the master, and a protrusion of the duplicate is a trapezoid in side view.

5. The method for manufacturing a magnetic transfer master disk according to claim 4, wherein a height of a protrusion is 5 to 800 nm, and half-value width indicating a width of the protrusion at a half-value height of the protrusion is 3 to 20000 nm.

6. The method for manufacturing a magnetic transfer master disk according to claim 5, wherein a height of the protrusion is 20 to 400 nm, and half-value width is 10 to 500 nm.

7. The method for manufacturing a magnetic transfer master disk according to claim 4, wherein an aspect ratio of a protrusion of the duplicate is 0.05 to 50.0 when the aspect ratio of a protrusion is defined as "height/half-value width."

8. The method for manufacturing a magnetic transfer master disk according to claim 7, wherein an aspect ratio of a protrusion of the duplicate is 0.2-5.0.

* * * * *